Jan. 17, 1956  W. RAPHAEL  2,731,166
CONTAINER LOCK
Filed June 14, 1952
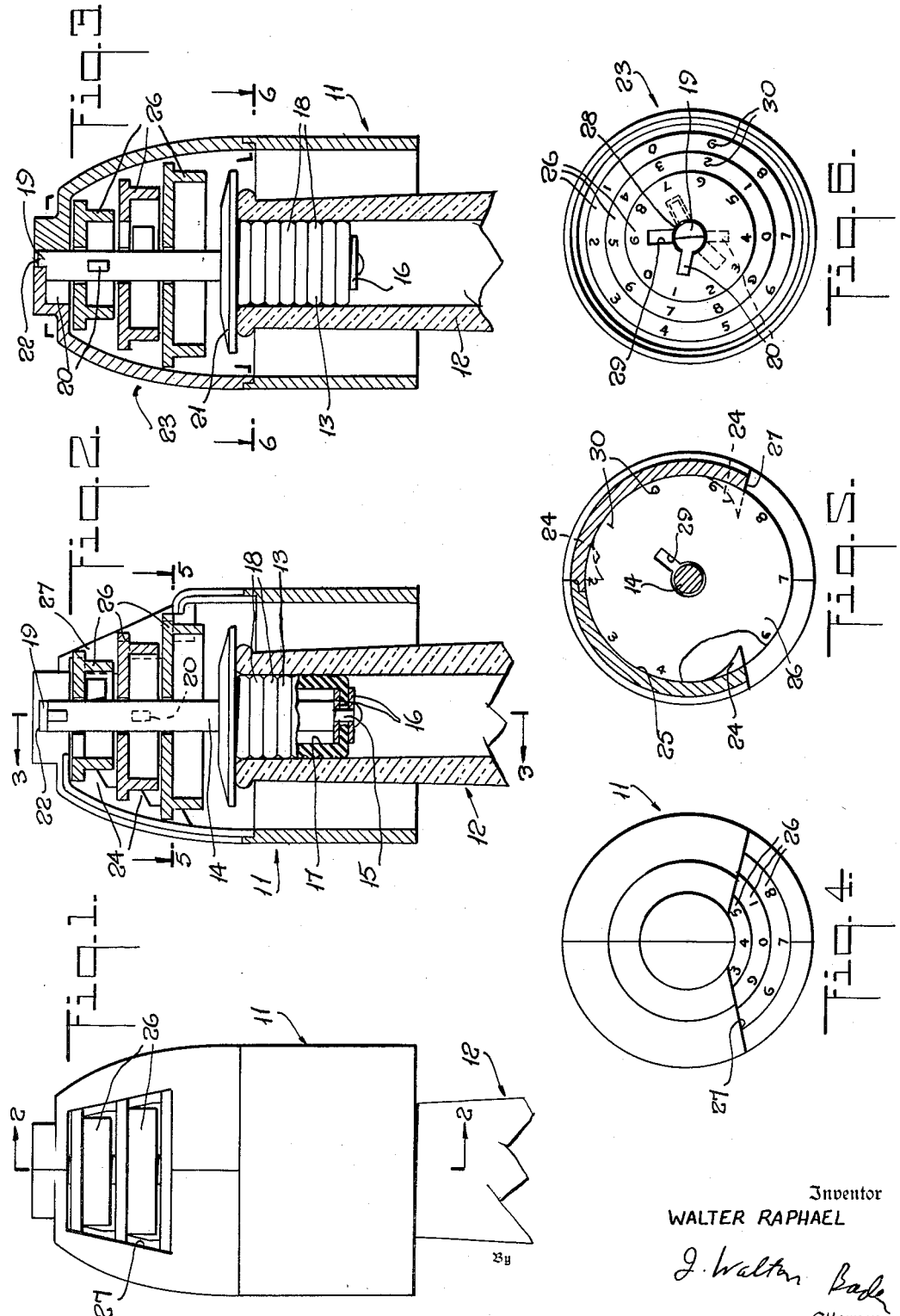
Inventor
WALTER RAPHAEL
Attorney United States Patent Office 2,731,166
Patented Jan. 17, 1956

2,731,166

CONTAINER LOCK

Walter Raphael, New York, N. Y., assignor to General Patent Production Company, New York, N. Y., a firm Application June 14, 1952, Serial No. 293,570

5 Claims. (Cl. 215—52)

This invention relates to a container lock and has particular applicability to the prevention of tampering with bottles containing alcoholic spirits.

Those who keep alcoholic spirits on their premises know that unauthorized persons generally tamper with the bottles by drinking a portion of the contents. In many cases, in order to give the appearance of the same level of liquid after tampering these persons add water to the contents of the container thereby effectively ruining same.

It is an object of this invention to provide a container lock that will effectively prevent tampering with the contents of the container.

It is a further object of this invention to provide a container lock that will not require separate keys for its operation.

It is a further object of this invention to provide a container lock that may be easily removed or attached to the container.

It is a further object of this invention to provide a container lock that will be simple and inexpensive.

Briefly stated the invention comprises a stopper adapted to be rigidly positioned within the mouth of a container and capable of being removed therefrom only when elongated in shape, a shaft member capable of elongating the shape of the stopper when depressed, a projection upon said shaft member and a disk member supported upon and rotatably secured to the shaft member. The disk member is provided with a recess of size to accommodate the aforesaid projection when brought into registration therewith so that the disk member can be removed from the shaft member. It is pointed out that the shaft member cannot elongate the stopper member when it is in position on the shaft member.

In the preferred modification of this invention the shaft member is formed with a tongue in the upper portion thereof which tongue is adapted to fit into a groove provided in a shield member. The shield member covers both the shaft member and the stopper member and is formed with a plurality of spaced flanges along the inner circumference thereof. A plurality of disk members are supported by the flanges.

In the preferred modification, in addition, a cut out portion is provided in the front of the shield member and the disk members bear indicia so that the operator of the device can determine when the recesses in the disk members are in registration with the horizontal projections of the shaft member.

The invention will be further described by reference to the accompanying drawings which are made a part of this specification.

Fig. 1 is a front view of the container locking device in position upon a container.

Fig. 2 is a sectional view of the device shown in Fig. 1 taken along lines 2—2 of Fig. 1.

Fig. 3 is a sectional view of the device shown in Fig. 2 taken along lines 3—3 of Fig. 2.

Fig. 4 is a top view of the device shown in Fig. 1.

Fig. 5 is a sectional view of the device shown in Fig. 2 taken along lines 5—5 of Fig. 2.

Fig. 6 is a sectional view of the device shown in Fig. 5 taken along lines 6—6 of Fig. 5.

There is provided locking device 11 which is disposed about container 12. Locking device 11 is formed of stopper 13 and shaft member 14 secured to stopper 13 and capable of elongating stopper 13 in shape. Stopper 13 is formed of resilient material so that it may be elongated as will be subsequently set forth. Shaft member 14 is preferably secured to stopper 13 by pin 15 which is held by flanges 16. Shaft member 14 extends through stopper 13 within recess 17. Stopper 13 is preferably formed with a plurality of ridges 18. Ridges 18 of stopper 13 act as gripping members between stopper 13 and the mouth of container 12 in which stopper 13 is positioned. Thus stopper 13 cannot be pulled out of container 12 but can only be removed by elongating stopper 13 and thus reducing its diameter.

Shaft member 14 is formed with tongue 19 at the upper end thereof and a plurality of spaced horizontal projections 20. Shield member 21, which is preferably a flange member, is secured to shaft member 14 and overlies the mouth of the container. Shield member 23 is provided with groove 22 within which tongue 19 fits. By this construction shield member 23 is not capable of rotation about shaft member 14.

Shield member 23 is formed with a plurality of spaced flange projections 24 which are located along the interior circumference 25 of shield member 23. Plurality of disk members 26 are adapted to overlie flange projections 24 and to rotate about shaft member 14. Shield member 23 is also formed with a cut-out portion 27 in the front thereof.

Disk members 26 are formed with a hole 28 at the center thereof and with a recess 29 adjoining hole 28. Recesses 29 are of sufficient size to accommodate horizontal portions 20 when recesses 29 are brought into registration with horizontal portions 20. Recesses 29 are preferably rectangular in shape.

Disks 26 are preferably formed with indicia 30 along the circumference thereof so that the points of registration of recesses 29 and horizontal portions 20 may be easily determined.

With the above general description the operation of the device may be easily explained.

When it is desired to lock the device shield member 23 and disk members 26 are removed from stopper 13 and shaft member 14.

Shaft member 14 and flange 21 are grasped by the operator shaft member 14 pushed down to partially elongate stopper 13. Stopper 13 is thus partially elongated and pushed into the mouth of container 12. The pressure on shaft member 14 is then released so that stopper 13 tends to resume its normal shape and in so doing tends to widen. Stopper 13, however, cannot widen to its fullest extent since it normally is wider than the mouth of container 12 in which it is positioned. Stopper 13 thus remains in the mouth of container 12 in partially compressed relationship. In this condition ridges 18 of stopper 13 bear against the inner surface of the mouth of container 12 and thus act as gripping members preventing pulling of stopper 13 from container 12. The container is thus firmly sealed. Disk members 26 are set to the proper position by means of indicia 30 so that recesses 29 are in registration with the horizontal portions 20 of shaft member 14.

Disks 26 are then rotated so as to conceal the correct alignment of the indicia.

In the closed position of the locking device, wherein stopper 13 is positioned within the mouth of container 12, shield member 23 covers shaft member 14 as shown in Figs. 2 and 3. Thus shaft member 14 cannot be pushed downwardly to elongate stopper 13 and permit its removal from the mouth of container 12 unless shield member 23 and its associated disk members 26 are first removed. When it is desired to unlock the container, however, the proper sequence of indicia are set by the operator and shield member 23 and disk members 26 are removed from stopper 13 and shaft member 14. This exposes shaft member 14 which may then be pushed down and flange member 21 when this member is provided to aid in the elongation of stopper 13, pulled up so that stopper 13 may be elongated and thus removed from container 12. The foregoing specific embodiments of the invention as shown in the foregoing specification are for illustrative purposes and for purposes of example only. Various changes and modifications can obviously be made within the spirit and scope of the invention and will occur to those skilled in this art.

I claim:

1. A container locking device comprising an elongatable stopper of resilient material formed with a circumferential ridge therein adapted to be rigidly positioned in partially compressed relationship within the mouth of a container and capable of removal therefrom only when further elongated in shape; a shaft member formed with a plurality of spaced substantially horizontal projections secured to said stopper at a point spaced from the top portion thereof, a plurality of rotatable disk members each provided with an opening to accommodate said projections when brought into registration therewith disposed about said shaft member, and a removable shield member provided with an opening therein held by said disk members and surrounding same.

2. A container locking device comprising an elongatable stopper of resilient material formed with a plurality of circumferential ridges therein adapted to be rigidly positioned in partially compressed relationship within the mouth of a container and capable of removal therefrom only when further elongated in shape; a shaft member formed with a plurality of spaced substantially horizontal projections extending through said stopper and secured to the bottom portion thereof, a plurality of rotatable disk members each provided with an opening to accommodate said projections when brought into registration therewith disposed about said shaft member, and a removable shield member provided with an opening therein held by said disk members and surrounding same.

3. A container locking device comprising an elongatable stopper of resilient material formed with a plurality of circumferential ridges therein adapted to be rigidly positioned in partially compressed relationship within the mouth of a container and capable of removal therefrom only when further elongated in shape; a shaft member formed with a plurality of spaced substantially horizontal projections extending through said stopper and secured to the bottom portion thereof, a flange member secured to said shaft member adapted to overlie the mouth of the container, a plurality of rotatable disk members bearing indicia thereon and each provided with an opening to accommodate said projections when brought into registration therewith disposed about said shaft member, and a removable shield member provided with an opening therein held by said disk members and surrounding same.

4. A container locking device comprising an elongatable stopper of resilient material formed with a plurality of spaced circumferential ridges therein, adapted to be rigidly positioned in partially compressed relationship within the mouth of a container and capable of removal therefrom only when further elongated in shape; a shaft member formed with a plurality of spaced horizontal projections extending through said stopper and secured to the bottom portion thereof, a flange member secured to said shaft member adapted to overlie the mouth of container, a plurality of rotatable disk members bearing indicia thereon at the side portions thereof and each provided with an opening to accommodate said projections when brought into registration therewith disposed about said shaft member, and a removable shield member formed with a plurality of spaced ridges on the interior thereof and a cut-out portion in the front portion thereof, said ridges within said shield member being adapted to support said disk members and said shield member surrounding said shaft member.

5. A container locking device comprising an elongatable stopper of resilient material formed with a plurality of circumferential ridges therein, adapted to be rigidly positioned in partially compressed relationship within the mouth of a container and capable of removal therefrom only when further elongated in shape; a shaft member formed with a tongue member at the top portion thereof and with a plurality of spaced horizontal projections, extending through said stopper and secured to the bottom portion thereof, a flange member secured to said shaft member adapted to overlie the mouth of the container, a plurality of rotatable disk members bearing indicia thereon at the side portions thereof and each provided with an opening to accommodate said projections when brought into registration therewith disposed about said shaft member, and a removable shield member formed with a plurality of spaced ridges on the interior surface thereof and with a cut-out portion in the front portion thereof surrounding said shaft member and said disk members, said ridges within said shield member surrounding said disk members at the lateral portions thereof.

References Cited in the file of this patent

UNITED STATES PATENTS

| | | |
|---|---|---|
| 487,748 | Jordan | Dec. 13, 1892 |
| 504,034 | Hay | Aug. 29, 1893 |
| 887,771 | Churchill | May 19, 1908 |
| 1,065,896 | Carter | June 24, 1913 |
| 2,315,538 | Moeller | Apr. 6, 1943 |

FOREIGN PATENTS

| | | |
|---|---|---|
| 269,138 | Switzerland | Oct. 2, 1950 |